(12) United States Patent
Plankenhorn et al.

(10) Patent No.: US 8,601,281 B2
(45) Date of Patent: Dec. 3, 2013

(54) METHOD FOR OPERATING A SENSOR APPARATUS AND SENSOR APPARATUS

(75) Inventors: Horst Plankenhorn, Villingen-Schwenningen (DE); Gunnar Schmidt, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 331 days.

(21) Appl. No.: 13/139,495

(22) PCT Filed: Nov. 23, 2009

(86) PCT No.: PCT/EP2009/065655
§ 371 (c)(1),
(2), (4) Date: Aug. 30, 2011

(87) PCT Pub. No.: WO2010/066566
PCT Pub. Date: Jun. 17, 2010

(65) Prior Publication Data
US 2011/0320064 A1    Dec. 29, 2011

(30) Foreign Application Priority Data
Dec. 12, 2008  (DE) .......................... 10 2008 061 710

(51) Int. Cl.
*G06F 11/30*  (2006.01)
(52) U.S. Cl.
USPC ............... 713/189; 701/1; 701/70; 701/93; 340/3.31; 340/903; 340/905; 340/5.3; 380/270; 380/46; 380/28
(58) Field of Classification Search
USPC .......... 701/1, 70, 93; 713/189; 340/3.31, 903, 340/905, 5.3; 380/270, 46, 28
See application file for complete search history.

(56) References Cited

U.S. PATENT DOCUMENTS 3,004,818 A * 10/1961 Delfs et al. ...................... 346/49
3,415,365 A * 12/1968 Faulkner ....................... 206/480
(Continued)

FOREIGN PATENT DOCUMENTS

DE   196 10 161 A1   9/1997
DE   198 21 696 A1   11/1999
(Continued)

OTHER PUBLICATIONS

Vassileios Tsetsos, et. al; Commercial Wireless Sensor Networks: Technical and Business Issues; Wireless On-demand Network Systems and Services, 2005. WONS 2005. Second Annual Conference on (0-7695-2290-0); 2005. p. 166-17.*

(Continued)

*Primary Examiner* — Luu Pham
*Assistant Examiner* — Angela Holmes
(74) *Attorney, Agent, or Firm* — Cozen O'Connor

(57) ABSTRACT

A sensor apparatus includes a housing with a security device, a secure first computation device, a second computation device and a sensor element. The sensor apparatus detects a temperature in the housing, to activate the first computation device only when the detected temperature is in a predefined temperature range, to determine a session key by the first computation device and to store the session key in a second memory of the second computation device, to deactivate the first computation device after the session key has been stored, to determine data on the basis of a sensor signal detected using the sensor element and to encrypt and/or sign the data by the second computation device on the basis of the session key.

17 Claims, 3 Drawing Sheets

(56) References Cited

U.S. PATENT DOCUMENTS

| | | | | |
|---|---|---|---|---|
| 3,590,379 | A | * | 6/1971 | Fellerman et al. ............ 324/169 |
| 3,781,906 | A | * | 12/1973 | Carney .......................... 346/137 |
| 4,200,812 | A | * | 4/1980 | Fichter .......................... 327/115 |
| 4,359,725 | A | * | 11/1982 | Balogh et al. ................. 340/576 |
| 4,423,631 | A | * | 1/1984 | Dold ............................... 73/431 |
| 4,507,963 | A | * | 4/1985 | Donner et al. ................... 73/431 |
| 4,517,647 | A | * | 5/1985 | Harada et al. ................... 701/78 |
| 4,617,893 | A | * | 10/1986 | Donner et al. ................. 123/361 |
| 4,694,273 | A | * | 9/1987 | Franchino ...................... 340/447 |
| 4,782,691 | A | * | 11/1988 | Clish .......................... 73/114.04 |
| 4,858,135 | A | * | 8/1989 | Clish et al. ....................... 701/93 |
| 4,961,145 | A | * | 10/1990 | Gernot ............................. 701/76 |
| 5,043,562 | A | * | 8/1991 | Hautvast et al. ............... 235/440 |
| 5,706,779 | A | * | 1/1998 | Hewitt .......................... 123/332 |
| 5,754,137 | A | * | 5/1998 | Durrstein ......................... 701/50 |
| 5,819,703 | A | * | 10/1998 | Hewitt .......................... 123/332 |
| 6,141,609 | A | * | 10/2000 | Herdeg et al. ................. 701/521 |
| 6,144,927 | A | | 11/2000 | Grill et al. |
| 6,285,953 | B1 | * | 9/2001 | Harrison et al. .............. 701/484 |
| 6,313,749 | B1 | * | 11/2001 | Horne et al. ................... 340/575 |
| 6,982,625 | B2 | | 1/2006 | Chainer et al. |
| 7,018,321 | B2 | * | 3/2006 | Claar et al. ...................... 477/92 |
| 7,300,079 | B2 | * | 11/2007 | Goetz ........................ 292/307 B |
| 7,431,523 | B2 | * | 10/2008 | Hautvast et al. ............... 400/693 |
| 7,452,628 | B2 | * | 11/2008 | Goetz et al. ..................... 429/96 |
| 7,520,002 | B2 | | 4/2009 | Naether |
| 8,055,418 | B2 | * | 11/2011 | Dreier et al. ..................... 701/62 |
| 8,099,207 | B2 | * | 1/2012 | Fletcher et al. ............... 701/32.7 |
| 8,154,570 | B2 | * | 4/2012 | Blank et al. ..................... 346/20 |
| 8,179,682 | B2 | * | 5/2012 | Cremer et al. ................. 361/748 |
| 8,255,990 | B2 | * | 8/2012 | Callenryd et al. ............... 726/20 |
| 8,275,509 | B2 | * | 9/2012 | Fritsch et al. ................ 701/30.6 |
| 8,484,475 | B2 | * | 7/2013 | Bohler et al. .................. 713/175 |
| 8,512,208 | B2 | * | 8/2013 | Hilberer ......................... 477/199 |
| 2001/0047244 | A1 | * | 11/2001 | Harrison et al. .............. 701/213 |
| 2003/0194088 | A1 | | 10/2003 | Fischer et al. |
| 2005/0020404 | A1 | * | 1/2005 | Claar et al. ..................... 477/107 |
| 2005/0196218 | A1 | * | 9/2005 | Hautvast et al. ............... 400/693 |
| 2006/0030194 | A1 | * | 2/2006 | Goetz ............................ 439/367 |
| 2006/0122846 | A1 | * | 6/2006 | Burr et al. .......................... 705/1 |
| 2006/0245809 | A1 | * | 11/2006 | Hautvast et al. ............... 400/613 |
| 2006/0250230 | A1 | * | 11/2006 | Fischer et al. ................. 340/500 |
| 2006/0270273 | A1 | * | 11/2006 | Goetz et al. .................... 439/557 |
| 2007/0034698 | A1 | * | 2/2007 | Hautvast et al. ............... 235/486 |
| 2008/0048825 | A1 | | 2/2008 | Naether |
| 2008/0219441 | A1 | | 9/2008 | Asperger et al. |
| 2008/0228980 | A1 | * | 9/2008 | Esfandabadi ................. 710/266 |
| 2008/0235520 | A1 | * | 9/2008 | Becker et al. ................. 713/189 |
| 2008/0244735 | A1 | * | 10/2008 | Callenryd et al. ............... 726/19 |
| 2008/0270519 | A1 | * | 10/2008 | Ekdahl et al. ................. 709/203 |
| 2008/0283613 | A1 | * | 11/2008 | Hautvast et al. ............... 235/486 |
| 2008/0291650 | A1 | * | 11/2008 | Hautvast et al. ............... 361/772 |
| 2009/0091148 | A1 | * | 4/2009 | Hautvast et al. .............. 294/64.1 |
| 2009/0153598 | A1 | * | 6/2009 | Blank et al. ..................... 346/20 |
| 2009/0326756 | A1 | * | 12/2009 | Fletcher et al. .................. 701/29 |
| 2010/0100749 | A1 | * | 4/2010 | Gerber et al. ................. 713/193 |
| 2010/0122056 | A1 | * | 5/2010 | Gerber et al. ................. 711/163 |
| 2010/0191413 | A1 | * | 7/2010 | Fritsch et al. .................... 701/34 |
| 2010/0208436 | A1 | * | 8/2010 | Cremer et al. ................. 361/748 |
| 2010/0250053 | A1 | * | 9/2010 | Grill et al. ........................ 701/33 |
| 2010/0256882 | A1 | * | 10/2010 | Dreier et al. ..................... 701/62 |
| 2010/0273476 | A1 | * | 10/2010 | Gut et al. ..................... 455/426.1 |
| 2010/0304929 | A1 | * | 12/2010 | Hilberer ......................... 477/183 |
| 2010/0322423 | A1 | * | 12/2010 | Boehler et al. ................. 380/255 |
| 2011/0015851 | A1 | * | 1/2011 | Burr et al. ...................... 701/117 |
| 2011/0119200 | A1 | * | 5/2011 | Hatta ............................ 705/335 |
| 2011/0137490 | A1 | * | 6/2011 | Bosch et al. ....................... 701/2 |
| 2011/0168505 | A1 | * | 7/2011 | Hilberer .................... 188/151 R |
| 2011/0173694 | A1 | * | 7/2011 | Gut et al. ......................... 726/20 |
| 2011/0208387 | A1 | * | 8/2011 | Bosch et al. ..................... 701/35 |
| 2011/0257815 | A1 | * | 10/2011 | Dittmers et al. .................. 701/2 |
| 2012/0232777 | A1 | * | 9/2012 | Elkaim et al. ................. 701/123 |
| 2012/0233081 | A1 | * | 9/2012 | Hishiki et al. ................. 705/317 |
| 2012/0245757 | A1 | * | 9/2012 | Bartholomaus et al. .......... 701/1 |
| 2012/0249133 | A1 | * | 10/2012 | Friedrich ....................... 324/247 |
| 2012/0269341 | A1 | * | 10/2012 | Hoffmann et al. ............... 380/28 |
| 2012/0296549 | A1 | * | 11/2012 | Adams .......................... 701/102 |

FOREIGN PATENT DOCUMENTS

| | | |
|---|---|---|
| DE | 19821696 | 11/1999 |
| DE | 102 13 658 A1 | 10/2003 |
| DE | 10213658 | 10/2003 |
| DE | 102004043052 | 9/2004 |
| DE | 103 32 452 A1 | 2/2005 |
| DE | 10332452 | 2/2005 |
| DE | 10 2004 043 052 B3 | 1/2006 |
| DE | 10 2005 008 928 A1 | 9/2006 |
| DE | 10 2005 022 437 A1 | 11/2006 |
| DE | 102005022437 | 11/2006 |
| DE | 19610161 | 9/2007 |
| EP | 1 605 410 A2 | 12/2005 |

OTHER PUBLICATIONS

Sastry Duri, et. al.;Data Protection and Data Sharing in Telematics; Mobile Networks and Applications; Dec. 2004. vol. 9,Iss.6.*

* cited by examiner

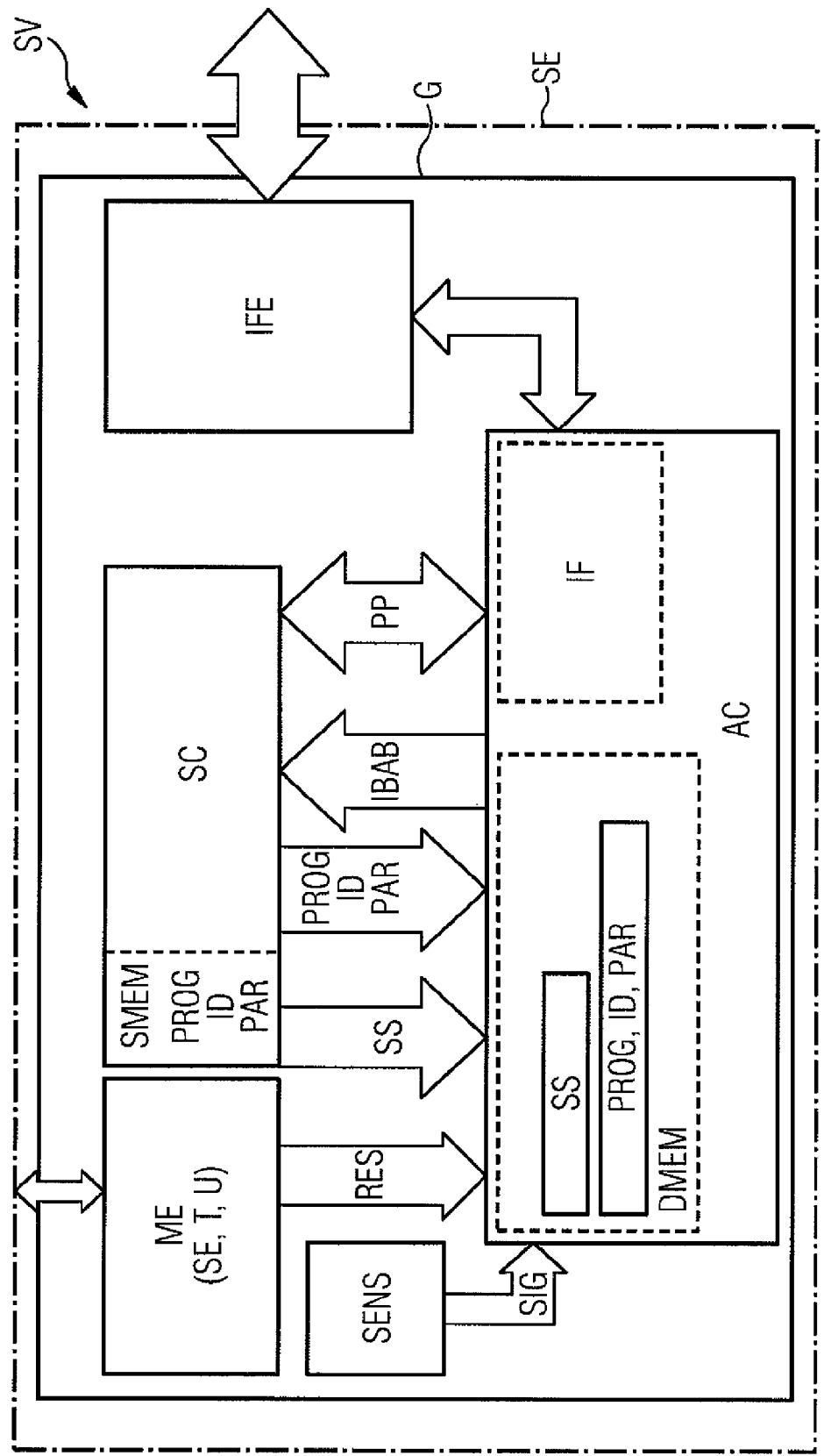

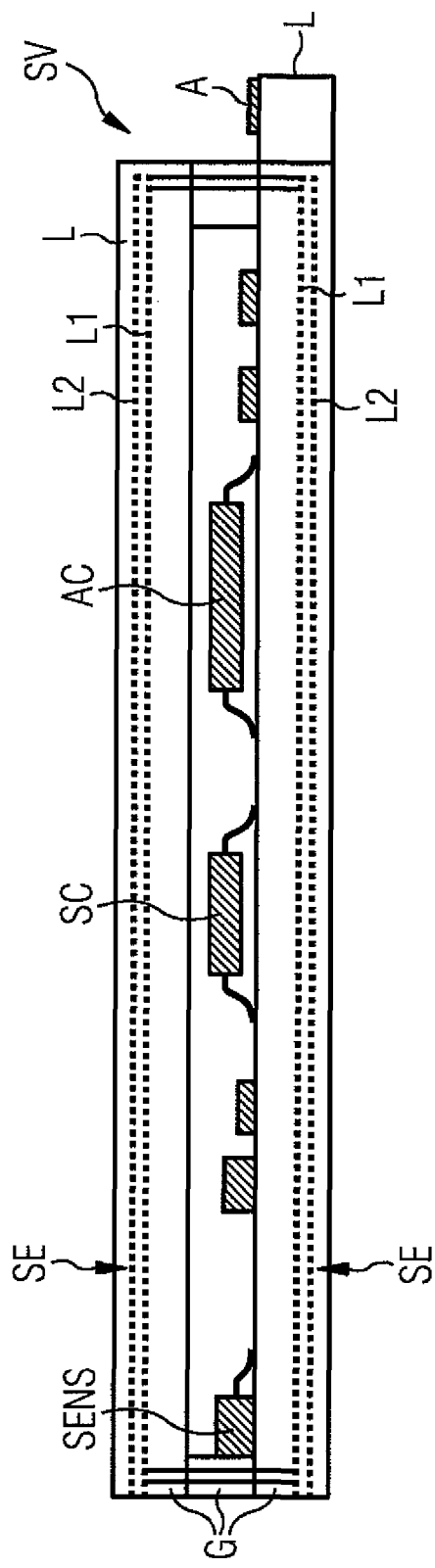
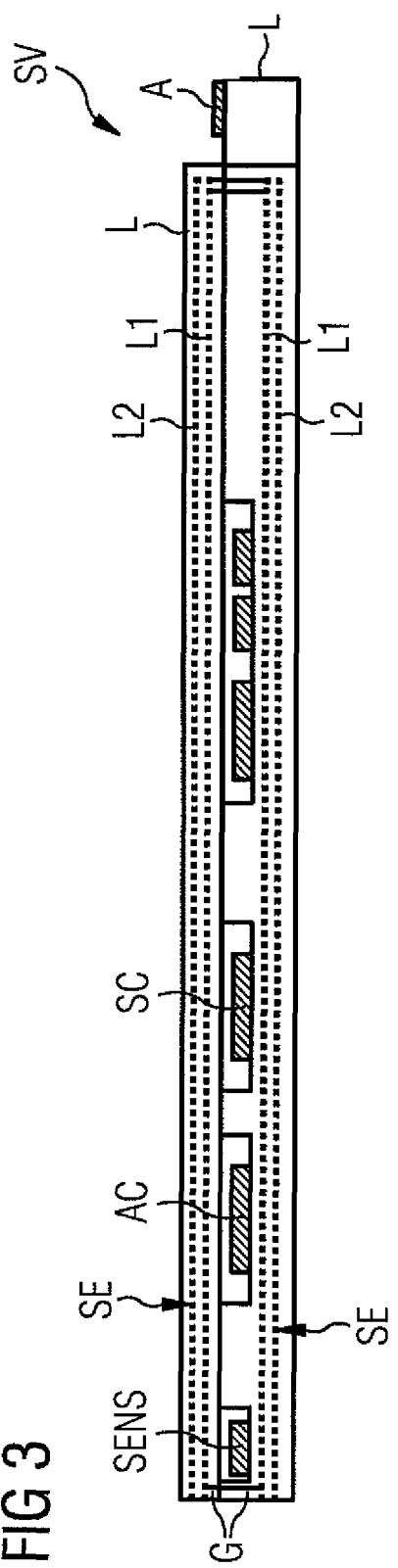

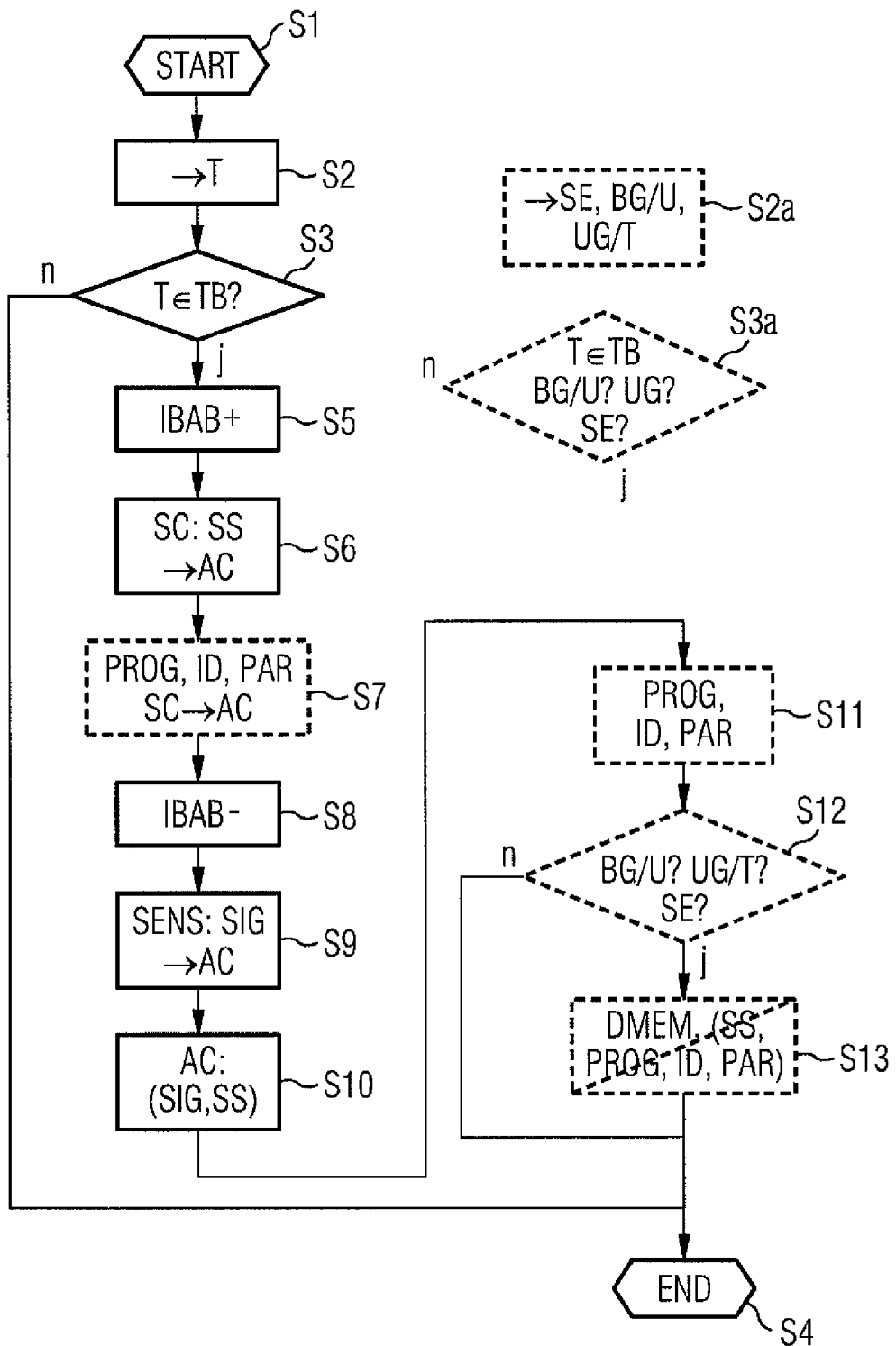

US 8,601,281 B2

METHOD FOR OPERATING A SENSOR APPARATUS AND SENSOR APPARATUS

PRIORITY CLAIM

This is a U.S. national stage of Application No. PCT/EP2009/065655, filed on Nov. 23, 2009, which claims priority to German Application No: 10 2008 061 710.5, filed: Dec. 12, 2008, the contents of which are incorporated herein by reference.

BACKGROUND OF THE INVENTION

1. Field of the Invention

The invention relates to a method for operating a sensor apparatus and to a sensor apparatus for a motor vehicle for coupling to a digital tachograph.

2. Related Art

U.S. Pat. No. 6,982,625 B2 discloses an event recorder for transmitting and storing electronic signature data. The event recorder is designed to be fitted to a vehicle and to transmit encrypted signatures and data. In the event of an accident or a traffic offense, an electronic fingerprint is thereby left behind and can be received by an external data acquisition device. The event recorder is integrated on a chip card arranged in a tamper-proof housing. The event recorder comprises a microcomputer, a memory, and a transmitter/receiver. A sensor is also provided for detecting sudden acceleration. Tampering with the event recorder can be detected by measuring physical forces on the event recorder and may result in the vehicle being immobilized.

DE 198 21 696 A1 discloses a method and an apparatus for transmitting and storing an item of information, in particular a distance covered by a motor vehicle, in a tamper-proof manner. The information is given by a number of temporally successive pulses. A counting unit counts arriving pulses. After predetermined periods of time in each case, the existing number of arrived pulses is transmitted to a receiver unit in a encrypted form according to an encryption algorithm. In the receiver unit, the number is decrypted according to the same encryption algorithm and the sum is determined and is stored. The counting unit contains a microprocessor with associated memory units and is connected to the receiver unit via a data line. The receiver unit contains a microprocessor and a memory. A pulse generator is connected to the counting unit in a tamper-proof manner.

DE 196 10 161 A1 discloses a data transmission apparatus in a vehicle including a pulse generator and a control device as well as a pulse generator for the control device. In addition to known transmission from the pulse generator to the control device, a signal generated by a sensor element is transmitted, on request by the control device, via a data line in encrypted form. In the control device, the signal transmitted in encrypted form is compared with the signal registered there and previously transmitted in a conventional manner. This comparison makes it possible to detect tampering on the transmission path. The pulse generator has a sensor element for detecting a rotational frequency of a transmission gearwheel and a signal conditioning circuit arrangement. The sensor element may be a Hall sensor element. The pulse generator or the control device has a monitoring function with a reset function. Initialization is provided with transmission of a key from the control device to the pulse generator.

SUMMARY OF THE INVENTION

An object of one embodiment of the invention is to provide a method for operating a sensor apparatus and a sensor apparatus, which method and apparatus are reliable and which apparatus enables a cost-effective sensor apparatus.

One embodiment of the invention is a method for operating a sensor apparatus and a corresponding sensor apparatus. The sensor apparatus comprises a housing having a security device for detecting unauthorized intervention in the housing. The sensor apparatus also comprises a secure first computation device that has a secure, non-volatile first memory arranged in the housing, and a second computation device that comprises a second memory or is assigned the second memory and is arranged in the housing with the second memory. The sensor apparatus also comprises at least one sensor element electrically coupled to the second computation device for the purpose of supplying a sensor signal from the at least one sensor element to the second computation device. A temperature in the housing is detected. The first computation device is activated only when the detected temperature lies in a predefined temperature range. A session key is determined by the first computation device. The session key is stored in the second memory. The first computation device is deactivated after the session key has been stored in the second memory. Data is determined on the basis of the sensor signal detected using the at least one sensor element. The data are also encrypted and/or signed by the second computation device on the basis of the session key.

In one embodiment of invention the secure first computation device, which is in the form of a chip card controller for example, can generally be operated in a low temperature range of, for example, approximately −20 to +70 or +85° C. in order to be able to ensure proper operation. However, in a motor vehicle in particular, the sensor apparatus must function reliably in a wider temperature range of, for example, approximately −40 to +150° C. Therefore, operation of the secure first computation device is restricted to the temperature range that enables proper operation of the first computation device. However, a reliable storage temperature range of the first computation device is wide enough to enable the first computation device to be stored in the currentless state in the wide temperature range provided for the motor vehicle, for example, without having to fear the first computation device being damaged. The information stored in the secure first memory of the first computation device in a manner securely protected from unauthorized tampering or access or which is determined by the first computation device on the basis of such unauthorized tampering or access, such as the session key can be made available to the second computation device, in particular when operation of the sensor apparatus is started, in particular by being stored in the second memory. This process can also be referred to as "pairing". The second computation device, which is in the form of a microcontroller generally does not have any security features like the secure first computation device and can be reliably used in the wider temperature range of the vehicle. After the session key has been stored in the second memory, the first computation device is deactivated and the data are encrypted and/or signed by the second computation device on the basis of the session key. The protective device of the housing, which operates at least during operation of the second computation device, protects the second computation device and the second memory and, in particular, the session key from unauthorized tampering or access. The sensor apparatus is thus particularly suitable for use in a vehicle and for coupling to a tachograph.

One advantage is that it is possible to use a cost-effective, commercially available secure first computation device which is already available with security certification. Information to be kept secret is thus securely stored in the first memory irrespective of whether current is applied to the sensor apparatus or the security device of the housing is operating. There is no need for a battery to provide electrical energy for times at which no electrical energy is supplied to the sensor apparatus from the outside. Furthermore, the sensor apparatus can be provided with security certification in a comparatively simple manner, in particular even in the event of changes in programs or program parts of the sensor apparatus, that is to say the software. The second computation device and the second memory are protected by the security device during operation of the sensor apparatus. The sensor apparatus can thus also be operated reliably and securely when the secure first computation device is not operating.

In one embodiment, the first computation device is activated and/or deactivated under the control of the second computation device. This has the advantage that no separate control device needs to be provided and that activation or deactivation can be carried out simply on the basis of information available to the second computation device. For example, pairing is carried out, on request, by an external apparatus to which the sensor apparatus is coupled, for example by the tachograph. Communication with the external apparatus is preferably carried out by the second computation device, with the result that the information relating to whether or not pairing should be currently carried out is available to the second computation device. The second computation device is therefore particularly suitable for controlling the first computation device.

In one embodiment, the security device of the housing is checked. The first computation device is activated only when integrity of the housing is determined when checking the security device. This has the advantage that it is thereby ensured that the session key, in particular, cannot be tapped in an unauthorized manner if it is or has been stored in the second memory.

In one embodiment, in addition to storing the session key in the second memory, the first computation device is used to read at least one program part and/or at least one identification data item and/or at least one parameter from the first memory and to store it/them in the second memory. The second computation device is operated using the transmitted at least one program and/or at least one identification data item and/or at least one parameter. The advantage is that this further information to be protected can be securely stored in the secure first memory and can be made available to the second computation device during pairing.

In one embodiment, the security device of the housing and at least one operating variable and/or ambient variable of the sensor apparatus are monitored. At least the session key is deleted from the second memory if violation of the integrity of the housing or an impermissible value or an impermissible change in the value of the at least one operating variable or ambient variable is determined. The advantage is that at least the session key is thus well protected from tampering or unauthorized access.

In this context, it is advantageous if, in addition to the session key, the transmitted at least one program part and/or the transmitted at least one identification data item and/or the transmitted at least one parameter is/are also deleted from the second memory. The advantage is that the at least one program part and/or the at least one identification data item and/or the at least one parameter is/are thus also well protected from tampering or unauthorized access.

In this context, it is also advantageous if deletion is effected by overwriting. This is particularly secure.

In one embodiment, the ambient variable is the temperature in the housing or the operating variable is an operating voltage of the sensor apparatus. As a result, tampering with the temperature or the operating voltage can be detected and at least the session key is protected from unauthorized tampering or unauthorized access.

In one embodiment of the sensor apparatus, the housing is formed from at least one printed circuit board on which the first and/or the second computation device is/are directly arranged. The advantage is that a very compact design of the sensor apparatus is possible. The housing is preferably formed from at least two printed circuit boards that form a printed circuit board stack. The at least one printed circuit board may also be in the form of a hybrid.

In this context, it is advantageous if the first and/or the second computation device is/are integrated in the at least one printed circuit board. This can also be referred to as "High Density Integration" or HDI for short. This enables a particularly compact design of the sensor apparatus.

In one embodiment of the sensor apparatus, the security device comprises at least two layers of conductor tracks formed on the at least one printed circuit board, and the conductor tracks are formed at least in a region of the housing to be protected. As a result, the security device can be formed on the housing in a very simple and cost-effective manner. The conductor tracks of the security device are preferably formed over the entire printed circuit board but at least in the region of the housing to be protected, that is to say, in particular, in a region of the second computation device and the second memory and a connection to the first computation device. Conductor tracks of the security device are preferably formed at a very short distance from one another and are preferably formed in meandering fashion, with the result that it is not possible to drill through the printed circuit board with a very fine drill without severing at least one of the conductor tracks thereby or establishing a short circuit between conductor tracks. Interruptions or short circuits of conductor tracks can be easily and reliably detected. The interior of the housing can thus be reliably protected.

In one embodiment of the sensor apparatus, the at least one sensor element is arranged in the housing. As a result, the sensor element is also reliably protected from tampering.

In one embodiment of the sensor apparatus, the at least one sensor element is in the form of a Hall sensor element, an inductive sensor element or a GMR sensor element. This makes it possible to determine a rotational speed, for example of a gearwheel of a transmission in a very simple manner.

In one embodiment of the sensor apparatus, the sensor apparatus is in the form of a speed sensor for a vehicle. As a result of the wide operating temperature range, the sensor apparatus is particularly suitable for use in the vehicle and, in particular, in a motor vehicle, for example on a transmission. On account of the high degree of tamper security of the sensor apparatus, the sensor apparatus is particularly suitable for coupling to the tachograph. Therefore, the sensor apparatus is preferably in the form of a speed sensor for the tachograph.

BRIEF DESCRIPTION OF DRAWINGS

Exemplary embodiments of the invention are explained below with reference to the schematic drawings, in which:
FIG. 1 is a block diagram of a sensor apparatus;
FIG. 2 is a first embodiment of the sensor apparatus;
FIG. 3 is a second embodiment of the sensor apparatus; and
FIG. 4 is a flowchart of a program for operating the sensor apparatus.

Elements having the same design or function are provided with the same reference symbols throughout the figures.

DETAILED DESCRIPTION OF THE PREFERRED EMBODIMENTS

A sensor apparatus SV is preferably in the form of a speed sensor for a vehicle and, in particular, a motor vehicle. The sensor apparatus SV is designed, in particular, to be coupled to a tachograph. Such a sensor apparatus SV must meet high security requirements, for example according to E3H or CC EAL 4+, or other relevant regulations. For use in a vehicle and, in particular, a motor vehicle, the sensor apparatus SV must also be able to be operated reliably and securely in a wide temperature range of, for example, approximately −40 to +150° C. Commercially available, secure computation devices, for example chip card controllers that can also be referred to as "Smart Card Controllers", have security features which make it difficult to tamper with and access stored or processed information in an unauthorized manner and are possibly already available in a cost-effective manner in a form which has security certification. However, according to their specification, said computation devices can generally be operated properly, that is to say reliably and securely, only in a low temperature range of, for example, approximately −20 to +70 or +85° C. and are therefore unsuitable for use in the vehicle or motor vehicle and, in particular, in a speed sensor which is generally arranged on a transmission of the vehicle or motor vehicle. However, these secure computation devices generally have a storage temperature range which is the wide temperature range; that is to say, the secure computation devices can be stored in the currentless state even at a temperature of 150° C., for example, without the risk of destruction. This makes it possible to provide the sensor apparatus SV with such a secure computation device and to operate it in the wide temperature range in a reliable and secure manner.

The sensor apparatus SV comprises such a secure first computation device SC having a non-volatile, secure first memory SMEM (FIG. 1). Information stored in the secure first memory SMEM is protected from unauthorized tampering and unauthorized access by the security features of the first computation device SC. This also applies, in particular, when the first computation device SC is not operating, that is to say is in the currentless state, or, accordingly, no operating voltage is applied. The sensor apparatus SV also comprises a second computation device AC in the form of a microcontroller, for example, and need not have any security features. The second computation device AC has an operating temperature range which comprises the wide temperature range of, for example, approximately −40 to +150° C. The second computation device AC can therefore also be reliably operated at temperatures at which the first computation device SC cannot be reliably and securely operated. The second computation device AC is assigned a second memory DMEM or the second computation device AC has the second memory DMEM. The second memory DMEM may be in the form of a volatile or non-volatile memory. The second memory DMEM is preferably in the form of a volatile memory.

The first computation device SC with the first memory SMEM and the second computation device AC with the second memory DMEM are arranged in a housing G having a security device SE. The security device SE is designed to make it possible to discern and, in particular, to automatically electrically detect unauthorized tampering with the housing G, for example opening of the housing G or drilling through or grinding of the housing G. The practice of opening or drilling through or grinding the housing G violates the integrity of the housing G. The security device SE preferably comprises narrow conductor tracks formed very close to one another at least in a region of the housing G to be protected but preferably on the entire housing G in such a manner that it is scarcely possible to open, drill through or grind the housing G without severing or interrupting at least one of the conductor tracks or giving rise to a short circuit between conductor tracks. The sensor apparatus SV preferably also has, in the housing G, a tampering detection device ME which is designed to electrically detect such severing, interruptions or short circuits and to determine the—at least possible—violation of the integrity of the housing G. For this purpose, the tampering detection device ME is electrically coupled to the security device SE. The tampering detection device ME is also preferably designed to detect at least one ambient variable UG of the sensor apparatus SV, in particular a temperature T in the housing G, and/or at least one operating variable BG of the sensor apparatus SV, in particular an operating voltage U of the sensor apparatus SV. Tampering with the sensor apparatus SV—which is at least possible—is detected, for example, in the event of an impermissible value or an impermissible change in the value of the at least one operating variable BG or ambient variable UG. For example, the tampering detection device ME is designed to generate a reset signal RES for resetting the second computation device AC, in particular. The tampering detection device ME may be in the form of a component which is separate from the second computation device AC or may be part of the second computation device AC.

The sensor apparatus SV also comprises at least one sensor element SENS which can also be referred to as a measuring head. The at least one sensor element SENS is preferably arranged inside the housing G protected by the security device SE but may also be arranged outside the housing G. The at least one sensor element SENS is designed to output a sensor signal SIG on the basis of a detected value of a measurement variable. The at least one sensor element SENS is preferably in the form of a Hall sensor element, an inductive sensor element or a GMR sensor element. However, the at least one sensor element SENS may also have a different design. The at least one sensor element SENS is preferably electrically coupled to the second computation device AC for the purpose of supplying the sensor signal SIG.

The sensor apparatus SV preferably also comprises an interface device IFE. The latter comprises, for example, a physical interface to the external device, in particular to the tachograph, and/or a power supply device and/or a monitoring device, which can also be referred to as a "watch dog" device, and/or a data input/output device. The interface device IFE is preferably electrically coupled to the second computation device AC, in particular. For this purpose, the second computation device AC preferably has an interface IF. The second computation device AC is electrically coupled to the first computation device SC. The interface IF may also be designed to electrically couple the second computation device AC to the first computation device SC.

Information to be protected is securely stored in the secure first memory SMEM. This information to be protected may include, for example, at least one program or program part PROG and/or at least one identification data item ID and/or at least one parameter PAR. The at least one program or the at least one program part PROG is intended, in particular, for execution on the second computation device AC and relates, in particular, to security-relevant functions, for example cryptographic functions such as encryption or signature of data. The at least one identification data item ID relates, for example, to information needed during an authentication procedure with the external device, in particular the tachograph. The at least one parameter PAR is, for example, a parameter which relates to the operation of the sensor apparatus SV.

However, the at least one program or the at least one program part PROG, the at least one identification data item ID or the at least one parameter PAR may also be provided in a different manner.

The first computation device SC is designed to determine a session key SS during a pairing process. The session key SS is then preferably transmitted to the second computation device AC and stored in the second memory DMEM. Furthermore, the at least one program or the at least one program part PROG and/or the at least one identification data item ID and/or the at least one parameter PAR is/are preferably also transmitted to the second computation device AC and stored in the second memory DMEM.

However, the first computation device is activated only when the temperature T in the housing G lies within a predefined temperature range TB, that is to say within the low temperature range in which the first computation device SC can be reliably and securely operated, for example within −20 to +70° C. The first computation device SC is preferably activated only for the pairing process and otherwise remains out of operation. The sensor apparatus SV is preferably electrically coupled to a terminal 30 of a vehicle power supply. As a result, the sensor apparatus SV can be supplied with electrical energy virtually without interruption, with the result that the pairing process has to be carried out only rarely. The pairing process is preferably carried out after a corresponding request which is transmitted, for example, by the external device and, in particular, by the tachograph to the sensor apparatus SV to the second computation device AC via the interface device IFE. The pairing process is preferably requested by the tachograph only if a factory chip card has been inserted into the latter. In this case, a new session key SS is preferably determined and stored in the first and second memories SMEM, DMEM. The pairing process is preferably carried out according to a pairing protocol PP between the first computation device SC and the tachograph using the interface IF of the second computation device AC.

In order to avoid such a pairing process if the session key SS has been deleted from the second memory DMEM, due to a brief interruption in the vehicle power supply, for example on account of a battery change, provision may be made for the session key SS, in particular, and optionally also the at least one program or the at least one program part PROG, the at least one identification data item ID and/or the at least one parameter PAR to be copied from the first memory SMEM of the first computation device SC to the second memory DMEM of the second computation device AC after a loss of the operating voltage, for a predefined period of time of less than ten to twenty minutes if it is determined, when operation is resumed after this brief interruption of less than the predefined period of time, that the protective device SE is intact and the temperature T in the housing G currently lies within the predefined temperature range TB. This is based on the assumption that it is highly unlikely to be possible to penetrate the housing G protected by the protective device SE within this predefined period of time without this being detected by the tampering detection device ME when operation is resumed. A new pairing process is required only when operation of the sensor apparatus SV has been interrupted for longer than the predefined period of time or the conditions for activating the first computation device SC have not been satisfied when operation is resumed. The predefined period of time is preferably dependent on a security level of the housing G and its protective device SE. In particular, the predefined period of time may be longer the higher the security level, that is to say the more difficult it is to penetrate the housing G without detection.

The sensor apparatus SV and, in particular, the second computation device AC are preferably designed to activate and/or deactivate the first computation device SC, preferably on the basis of the temperature T in the housing G. The first computation device SC is preferably activated/deactivated IBAB by activating and deactivating a power supply for the first computation device SC. Deactivating the power supply for the first computation device SC means that the sensor apparatus SV can also be reliably and securely operated at temperatures at which reliable and secure operation of the first computation device SC is not ensured.

The second computation device AC is designed to encrypt and/or sign data, which was determined on the basis of the sensor signal SIG and on the basis of the session key SS stored in the second memory DMEM. The encrypted and/or signed data is made available to the sensor apparatus SV on the output side and are transmitted, for example, to the external device and, in particular, to the tachograph, for example via the interface device IFE. The encryption and/or signing can be carried out using the at least one program or program part PROG stored in the second memory DMEM during the pairing process. However, the second computation device preferably also resorts to programs or program parts stored in a read-only memory or a flash memory assigned to the second computation device AC or comprised by the second computation device AC. This relates, in particular, to programs or program parts which are not relevant to security or are only slightly relevant to security.

FIG. 2 shows a sectional illustration of a first embodiment of the sensor apparatus SV. The housing G is formed by at least one printed circuit board L and preferably by at least two printed circuit boards L which, as a printed circuit board stack, are arranged at a distance from one another in such a manner that the electrical components of the sensor apparatus SV are arranged between them. The first and second computation devices SC, AC with the first and second memories SMEM, DMEM are directly applied to at least one printed circuit board L. The at least one sensor element SENS and/or the tampering detection device ME and/or the interface device IFE is/are also preferably directly applied to one of the at least one printed circuit board L, preferably inside the housing G formed by the at least one printed circuit board L. Connections A, in particular for coupling to a power supply and/or to the external device, in particular the tachograph, are provided on the outside of the housing G. The protective device SE preferably comprises at least two layers of conductor tracks applied to the respective printed circuit board L. For example, a first layer L1 having conductor tracks and a second layer L2 having conductor tracks are provided.

FIG. 3 shows a sectional illustration of a second embodiment of the sensor apparatus SV. The second embodiment corresponds substantially to the first embodiment. However, components and, in particular, chips of the first and second computation devices SC, AC are integrated in the at least one printed circuit board L. As a result, so-called "High Density Integration" or HDI for short is formed.

Other embodiments of the sensor apparatus SV are likewise possible. The at least one printed circuit board L with the applied components may be in the form of a printed circuit or a hybrid circuit, for example.

FIG. 4 shows a flowchart of a program for the operating sensor apparatus SV. The program begins with a step S1 in which, for example, the power supply for the sensor apparatus SV is activated or switched on and the request from the external device, in particular, the tachograph to carry out the pairing process is received.

In a step S2, the temperature T in the housing G is detected. In a step S3, a check is carried out in order to determine whether the temperature T lies within the predefined temperature range TB. Alternatively, steps S2a and S3a may also be provided. In step S2a, in addition to detecting the temperature T, the protective device SE is interrogated and/or the at least one operating variable BG, for example the operating voltage of the sensor apparatus SV, and/or the at least one ambient variable is/are detected. In step S3a, in addition to checking the temperature T according to step S3, a check is then carried out in order to determine whether the integrity of the housing G exists and/or whether the at least one operating variable or ambient variable has a permissible value, for example by comparison with a respective predefined range of values. The check is preferably carried out by the second computation device AC but may also be carried out by the tampering detection device ME, for example. If the condition in step S3 or S3a has not been met, the pairing process is not performed and the program preferably ends in a step S4.

However, if the condition in step S3 or S3a has been met, the first computation device SC is activated in a step S5 by the second computation device AC. In a step S6, the first computation device SC determines the session key SS and the session key SS is stored in the second memory DMEM, preferably after transmission to the second computation device AC. A step S7 may be provided in which the at least one program or the at least one program part and/or the at least one identification data item ID and/or the at least one parameter PAR from the first memory SMEM is/are stored in the second memory DMEM, preferably after transmission to the second computation device AC. Shortly after storage or transmission of the session key SS or the at least one program or program part PROG and/or identification data item ID and/or parameter PAR has been concluded, the first computation device SC is deactivated in a step S8 by the second computation device AC.

In a step S9, the sensor signal SIG is detected by the at least one sensor element SENS and is preferably supplied to the second computation device AC. In a step S10, the second computation device AC encrypts and/or signs data, which are determined on the basis of the sensor signal SIG, on the basis of the session key SS and preferably provides the sensor apparatus SV with said data on the output side.

A step S11 may be provided in which the second computation device AC is operated using the at least one program or program part PROG and/or identification data item ID and/or parameter PAR. Step S11 may also partially or fully coincide with step S10, that is to say the determination of the data and/or the encryption and/or signing of the data and/or the provision of the encrypted and/or signed data may be carried out on the basis of the at least one program or program part PROG and/or the at least one identification data item and/or the at least one parameter PAR.

A step S12 may also be provided in which the security device SE and/or the at least one operating variable BG and/or the at least one ambient variable UG is/are monitored. If a potential attempt at tampering is detected, provision may preferably be made in a step S13 for memory contents of the second memory DMEM to be completely or partially deleted, preferably by overwriting. In particular, the session key SS is deleted from the second memory DMEM. The at least one program or the at least one program part PROG and/or the at least one identification data item ID and/or the at least one parameter PAR is/are preferably also deleted from the second memory DMEM. If the power supply for the sensor apparatus SV is insufficient, residual energy, for example, from a capacitor, can be used for deletion. The program then prefer-ably ends in step S4. If no potential tampering is detected in step S12, the sensor apparatus SV continues to be operated normally, the functions mentioned in steps S10 and S11 being performed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a sensor apparatus that comprises:
   a housing having a security device configured to detect unauthorized access to the housing;
   a secure first computation device having a secure non-volatile first memory arranged in the housing;
   a second computation device having a second memory or is assigned the second memory arranged in the housing with the second memory; and
   at least one sensor element electrically coupled to the second computation device configured to supply a sensor signal to the second computation device,
   the method comprising:
   detecting a temperature in the housing; activating the first computation device only when the detected temperature is in a predefined temperature range;
   determining a session key by the first computation device;
   storing the session key in the second memory;
   reading at least one program from the first memory by the first computation device;
   storing the at least one program in the second memory by the first computation device;
   deactivating the first computation device after the session key is stored in the second memory;
   determining data based at least in part on the sensor signal; and
   at least one of encrypting and signing the data by the second computation device based on the session key,
   wherein the second computation device is operated using the at least one program.

2. The method as claimed in claim 1, wherein the first computation device is one or more of activated and deactivated under the control of the second computation device.

3. The method as claimed in claim 1, further comprising:
   checking the security device of the housing; and
   activating the first computation device only when an integrity of the housing is determined from the checking of the security device.

4. The method as claimed in claim 1, wherein, the first computation device:
   reads from the first memory and stores in the second memory at least one of:
      at least one identification data item,
      at least one parameter; and the second computation device is operated using at least one of the at least one identification data item, and the at least one parameter.

5. The method as claimed in claim 1, further comprising:

monitoring one or more of the security device of the housing, at least one operating variable, and an ambient variable; and deleting at least the session key from the second memory upon determining at least one of a violation of the integrity of the housing, an impermissible value, an impermissible change in the value of the at least one operating variable, and an ambient variable.

6. The method as claimed in claim 5, further comprising deleting from the second memory one or more of the at least one identification data item and the at least one parameter.

7. The method as claimed in claim 5, wherein at least one of:

the ambient variable is the temperature in the housing and the operating variable is an operating voltage of the sensor apparatus.

8. The method as claimed in claim 6, wherein deleting is effected by overwriting.

9. A sensor apparatus comprising:

a housing;

a security device including circuitry arranged in the housing configured to detect unauthorized intrusion into the housing;

a secure first computation device arranged in the housing having a secure non-volatile first memory;

a second computation device one of having a second memory and being assigned the second memory is arranged in the housing with the second memory; and at least one sensor element that is electrically coupled to the second computation device and configured to supply a sensor signal to the second computation device, wherein the sensor apparatus is configured to:

detect a temperature in the housing;

activate the first computation device only when the detected temperature is in a predefined temperature range;

determine a session key by the first computation device;

store the session key in the second memory;

read at least one program from the first memory by the first computation device;

store the at least one program in the second memory by the first computation device;

deactivate the first computation device after the session key has been stored in the second memory;

determine data based on the sensor signal; and at least one of encrypt and sign the data by the second computation device based on the session key, wherein the second computation device is operated using the at least one program.

10. The sensor apparatus as claimed in claim 9, wherein the housing is formed from at least one printed circuit board on which at least one of the first and the second computation device is directly arranged.

11. The sensor apparatus as claimed in claim 9, wherein the at least one sensor senses a speed of a vehicle.

12. The sensor apparatus as claimed in claim 10, wherein at least one of the first and the second computation device is integrated in the at least one printed circuit board.

13. The sensor apparatus as claimed in claim 10, wherein the security device comprises at least two layers of conductor are formed on the at least one printed circuit board at least in a region of the housing to be protected.

14. The sensor apparatus as claimed in claim 12, wherein the security device comprises at least two layers of conductor are formed on the at least one printed circuit board at least in a region of the housing to be protected.

15. The sensor apparatus as claimed in claim 14, wherein the at least one sensor element is arranged in the housing.

16. The sensor apparatus as claimed in claim 15, wherein the at least one sensor element is configured as one of a Hall sensor element, an inductive sensor element, and a Giant Magnetoresistance (GMR) sensor element.

17. The sensor apparatus as claimed in claim 16, wherein the sensor apparatus is configured as a speed sensor for a vehicle.

* * * * *